2,634,820

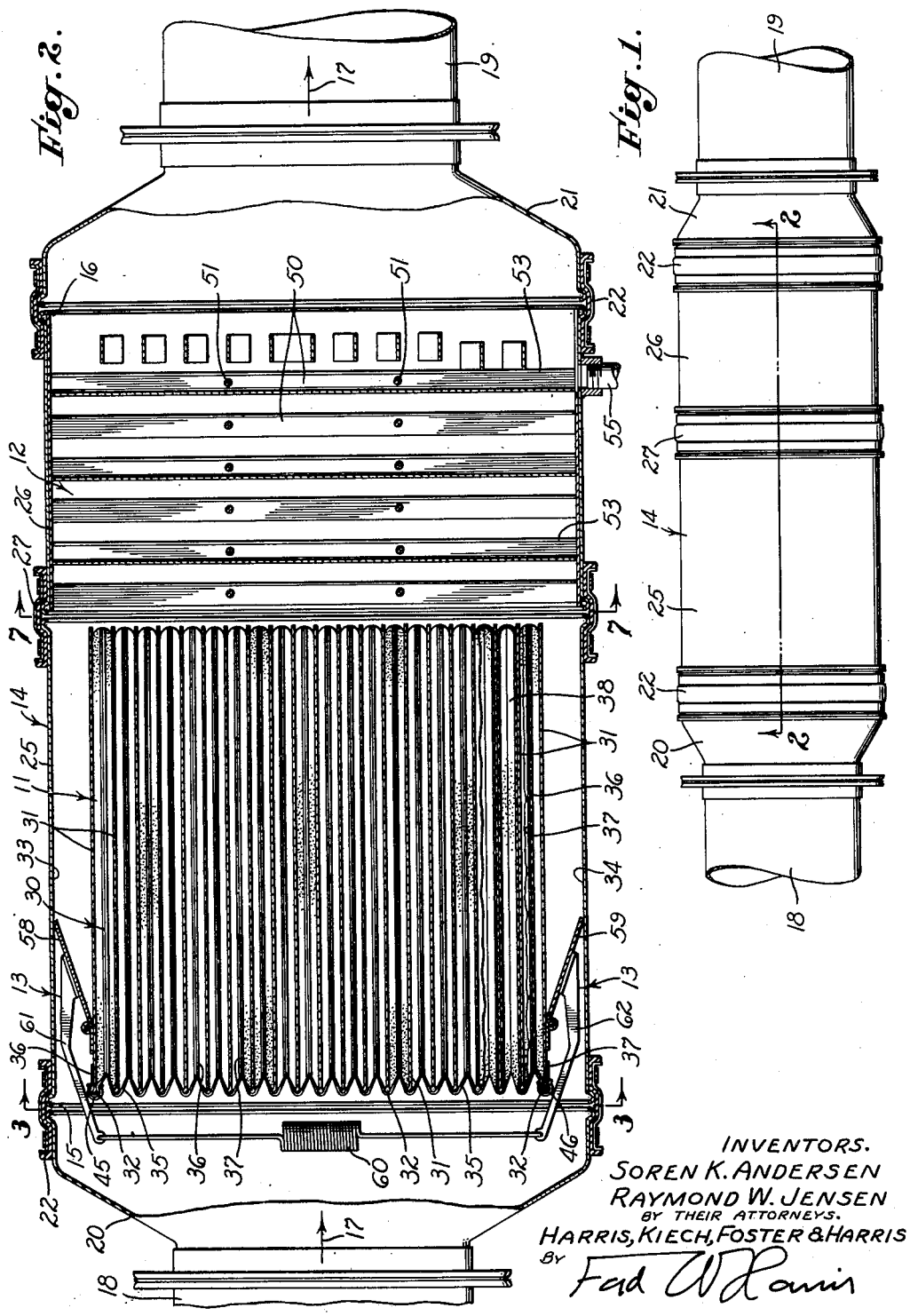

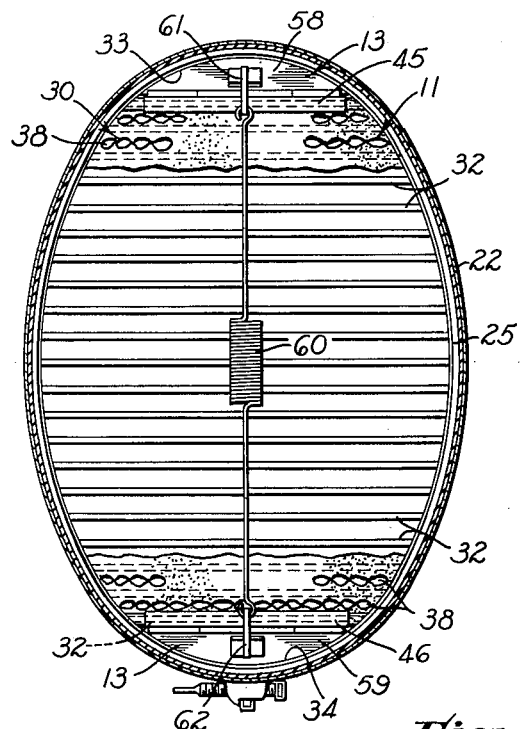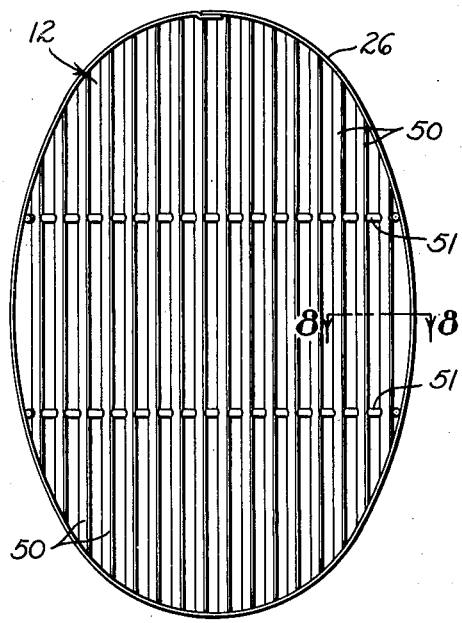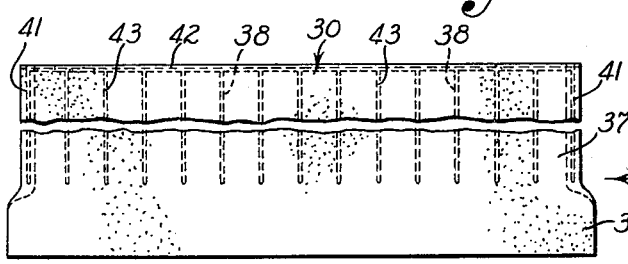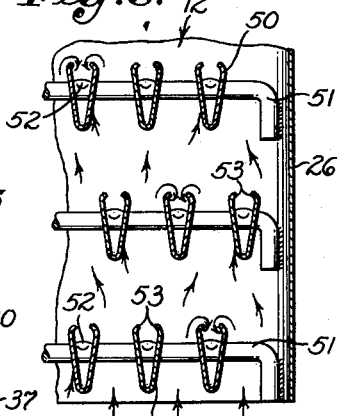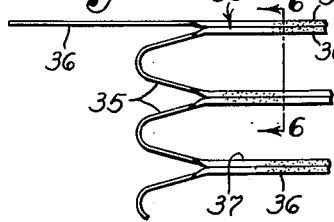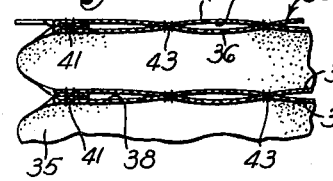
INVENTORS.
SOREN K. ANDERSEN
RAYMOND W. JENSEN
BY THEIR ATTORNEYS.
HARRIS, KIECH, FOSTER & HARRIS Patented Apr. 14, 1953

UNITED STATES PATENT OFFICE 2,634,820

GAS-LIQUID SEPARATOR

Soren K. Andersen and Raymond W. Jensen, Los Angeles, Calif., assignors to The Garrett Corporation, Los Angeles, Calif., a corporation of California Application August 18, 1947, Serial No. 769,272

1 Claim. (Cl. 183—39)

Our invention relates generally to apparatus for separating liquids from gases or gaseous fluids and, more particularly, to an apparatus for removing particles of water or other liquids from gases such as air. Since the invention finds particular utility in air conditioning systems, such as those employed to condition the air delivered to an aircraft cabin, for example, we prefer to consider such an application of the invention herein for convenience in effecting a disclosure thereof. However, it will be understood that the invention is not to be limited to air conditioning systems since various other applications thereof are possible as will be apparent to those skilled in the art.

When the ambient temperature is such that the temperature of the air delivered to an aircraft cabin or other chamber must be reduced, it is customary to refrigerate at least a portion of the air supplied to the cabin by compressing it so as to elevate its pressure and temperature substantially above atmospheric, subsequently reducing the temperature of the compressed air in a suitable heat exchanger which may utilize ambient air as the cooling medium, and thereafter expanding the compressed air to a pressure commensurate with that desired in the cabin, the result of such expansion being to reduce the temperature of the air below the ambient temperature. The expansion may take place in an air turbine, for example, which turbine is preferably connected to the compressor so that the work done by the air in expanding may be utilized to offset at least partially the work done upon the air in compressing it.

If the temperature of the air cooled by expansion in the turbine or other device is reduced below the dew point, which is frequently the case, some of the water vapor in the air condenses to form exceedingly fine, discrete droplets which appear as a light fog in the air stream emanating from the turbine. Since the quantity of condensate formed in this manner is frequently excessive, it may be necessary to remove at least a portion of this condensate from the air entering the cabin so that better control of the humidity of the air in the cabin may be attained, this being desirable both from the standpoint of passenger comfort and from the standpoint of preventing deterioration of the equipment and furnishings in the cabin. In cases where close humidity control might be desirable a humidistat may be located within the cabin or the duct leading thereto in order to control the mixing of a portion of saturated air as it leaves the turbine with a portion of the air from which the entrained water has been removed. It is also possible to control the humidity by injecting a controlled spray of water into the air before it enters the cabin. These methods of humidity control are well known in the air conditioning art and form no part of this invention.

We have found that known types of apparatus for separating liquids from gases will not remove the exceedingly fine condensate droplets produced by expanding air in the foregoing manner to a satisfactory degree and, accordingly, the provision of a separating apparatus which will operate successfully on such fine droplets is a primary object of the invention.

In general, an apparatus embodying the present invention includes coalescing means for causing the condensate droplets in the air stream emanating from the turbine or other expansion device to coalesce so as to form relatively larger drops, and includes eliminating means located downstream from the coalescing means for collecting such larger drops and for conveying same out of the path of the air stream, an important object of the invention being to provide an apparatus of this character having improved coalescing and eliminating means.

Another object is to provide a coalescing means comprising a foraminous element, preferably formed of a fibrous material, through which the expanded air is required to flow and which is adapted to collect the fine condensate droplets entrained therein and combine them into larger drops. We have found that a coalescing element formed of glass cloth is well suited for this purpose, although other fibrous materials may be employed if desired.

An important object is to provide a coalescing element which presents a maximum of surface area on which the condensate droplets may collect. It is a further object to provide such a coalescing element which consists of a plurality of sheets of fibrous material connected to form a plurality of elongated pockets into which the air bearing the condensate droplets is required to flow so that the fine condensate droplets will be forced, by the nature of the element, to combine with each other within the interstices of the element and ultimately to be rejected from the element, by the velocity of the air moving therethrough, as larger droplets of water.

Still another object of our invention is to provide an eliminating means which comprises a plurality of generally vertical baffles or vanes for collecting the water entrained in the air stream emanating from the coalescing means and for conveying such drops downwardly out of the path of the stream. An important object in this connection is to provide substantially V-shaped collecting vanes which have their apices directed upstream so that low pressure areas are created on the downstream sides thereof, whereby drops of water entrained in air flowing into such low pressure areas are carried into the vanes and are conveyed downwardly thereby out of the path of the air stream. Another object in this connection is to provide an apparatus of this nature having a drain connected thereto at the lower ends of the collecting vanes so that the water collected by the vanes may drain from the apparatus.

Another important object of the invention is to provide a separating apparatus having by-pass means for diverting the air stream around the coalescing means in the event that flow through the latter is interrupted for any reason, as by the formation of ice therein due to cooling of the air and the condensate droplets entrained therein below 32° F. in the expansion device. Thus, the by-pass means prevents a shut-down of, or damage to, the air conditioning system, which is an important feature of the invention.

The foregoing objects of our invention and the advantages suggested thereby, together with various other objects and advantages which will be evident hereinafter, may be realized through the employment of the exemplary embodiment which is illustrated in the accompanying drawings and which is described in detail hereinafter.

Referring to the drawings, which are intended as illustrative only:

Fig. 1 is a plan view on a reduced scale of an apparatus embodying the invention;

Fig. 2 is a sectional view taken along the broken line 2—2 of Fig. 1;

Fig. 3 is a sectional view taken along the broken line 3—3 of Fig. 2 with a portion of a coalescing element forming part of the apparatus removed;

Fig. 4 is an enlarged plan view of a portion of the coalescing element prior to installation in the apparatus;

Fig. 5 is an enlarged, fragmentary elevational view of the coalescing element and is taken in the direction indicated by the arrow 5 in Fig. 4;

Fig. 6 is an enlarged, fragmentary sectional view taken along the broken line 6—6 of Fig. 5;

Fig. 7 is a sectional view which is taken along the broken line 7—7 of Fig. 2 and which illustrates an eliminating means forming part of the apparatus;

Fig. 8 is an enlarged, fragmentary sectional view which is taken along the broken line 8—8 of Fig. 7 and which illustrates collecting vanes forming part of the eliminating means; and Fig. 9 is a view showing a modified form of collecting vane.

Referring particularly to Figs. 1 and 2 of the drawings, the separating apparatus includes, in general, coalescing means 11 for effecting coalescence of particles of liquid entrained in a stream of air or other gaseous fluid flowing therethrough so as to form relatively larger drops of the liquid, includes eliminating means 12 located downstream from the coalescing means for collecting such larger drops and conveying them downwardly out of the path of the stream, and includes by-pass means indicated generally by the numeral 13 for diverting the stream around the coalescing means 11 in the event that flow through the latter is prevented for any reason, as by the formation of ice therein, as will be discussed in more detail hereinafter. The coalescing means 11, eliminating means 12 and by-pass means 13, are enclosed by a housing 14 which forms a conduit having an inlet end 15 and an outlet end 16, flow through the housing or conduit 14 being in the direction of the arrows 17 in Fig. 2. Assuming that the apparatus is to be used in connection with an air conditioning system as hereinbefore discussed, the conduit 14 may be connected at its inlet end to an inlet duct 18 leading from an air turbine or other expansion device, and may be connected at its outlet end to an outlet duct 19 leading to an aircraft cabin or other chamber which is to be supplied with conditioned air. The inlet and outlet ducts 18 and 19 may be connected to the conduit 14 through adapters 20 and 21, respectively, which are attached to the conduit by clamping straps 22 adapted to provide a fluid-tight seal in a manner well known in the art.

Although the housing or conduit 14 may be formed in one piece if desired, it is preferably formed in two sections 25 and 26 for convenience in manufacture, the two housing sections being attached to each other by a clamping strap 27 which is similar to the straps 22. The housing section 25 contains the coalescing means 11 and the by-pass means 13 and the housing section 26 contains the eliminating means 12, so that the apparatus is formed in two separate units which are detachably connected by the clamping strap 27, the coalescing means 11, together with the by-pass means 13, forming one unit of the apparatus and the eliminating means 12 forming the other unit. As best shown in Figs. 3 and 7, the two units are of elliptical cross-section so they will fit in the space available in certain types of aircraft, although it will be understood that these units may be of any cross-sectional shape without departing from the spirit of the invention.

Considering the separating apparatus in more detail with particular reference to Figs. 2 to 6 of the drawings, the coalescing means 11 includes a coalescing element 30 supported by partitions or separators 31 which are parallel to the axis of the housing section 25 and which are welded or otherwise secured thereto along their longitudinal edges, the separators, each of which is provided with a bead 32 along its upstream edge, being disposed in horizontal planes in the particular construction illustrated although it will be understood that they may be disposed in vertical or other planes if desired. It will be noted that the uppermost and lowermost of the separators 31 are spaced from the uppermost and lowermost portions of the housing section 25 to provide passages 33 and 34 through which the air stream may be diverted around the coalescing means 11 as will be discussed in more detail hereinafter.

The coalescing element 30 comprises a plurality of substantially U-shaped sheets 35 of fibrous material each having arms 36 and 37 and each being slipped over one of the separators 31 so that the arms thereof receive the separator therebetween, all as best shown in Fig. 2. The upper arm 36 of each of the U-shaped sheets 35 is stitched or otherwise connected to the lower arm 37 of the sheet thereabove in such a manner as to form therebetween a plurality of elongated, finger-like pockets 38 each of which is substantially parallel to the direction of flow through the apparatus and each of which is provided with an open end facing upstream so that air having condensate droplets or other particles of liquid entrained therein is required to flow into the pockets and thence through the walls thereof. The manner in which the sheets 35 are stitched together to form the pockets 38 is indicated in Figs. 4 to 6, which illustrate fragments of the coalescing element 30 prior to insertion in the housing section 25. As best shown in Fig. 4 of the drawings, the upper arm 36 of one sheet may be attached to the lower arm 37 of the adjacent sheet by rows of stitching along their longitudinal edges 41 and their downstream edges 42, and by longitudinal rows 43 of stitching intermediate the longitudinal edges 41.

After the sheets 35 have been sewed together in the manner described to form the coalescing element 30, the element may be installed in the housing section 25 by inserting the interconnected arms 36 and 37 of adjacent ones of the sheets between adjacent ones of the separators 31 so that the coalescing element assumes the position shown in Fig. 2. Despite the fact that the housing section 25 is of elliptical cross-section in the particular construction shown, the sheets 35 are preferably all of the same width, the differences between the width of the sheets and the widths of the spaces between the separators 31 at the upper and lower ends of the elliptical housing section being taken care of by compressing the sheets inserted in such spaces laterally to some extent. The coalescing element 30 is secured in the housing section 25 by folding the upper arm 36 of the uppermost U-shaped sheet 35 around the bead 32 at the upstream edge of the uppermost separator 31 and then slipping a clip 45 over this bead as best shown in Fig. 2. Similarly, the lower arm 37 of the lowermost U-shaped sheet 35 is folded around the bead 32 along the upstream edge of the lowermost separator 31 and is attached thereto by a similar clip 46. Preferably, the upper arm of the uppermost sheet and the lower arm of the lowermost sheet are merely tabs of sufficient length to be folded around the beads of the corresponding separators 31.

Considering the operation of the coalescing means 11, as the air which has been cooled by expansion enters the apparatus, it flows into the elongated pockets 38 through the openings at the upstream ends thereof and then flows through the walls of the pockets and continues downstream toward the eliminating means 12. As will be apparent, some of the air may flow through the U-shaped sheets 35 at the upstream ends thereof without necessarily flowing into the pockets 38. The function of the sheets of fibrous material is to collect the fine water droplets entrained in the air flowing therethrough so that each of the droplets will combine with others to form larger drops which may be removed from the air stream by the eliminating means 12. We have found that glass cloth is particularly well suited for this purpose, although other materials may be used without necessarily departing from the spirit of the invention.

After moisture laden air has passed through the coalescing element 30 for some time, the element becomes saturated with the moisture collected thereby so that the moisture begins to escape therefrom in the form of relatively larger drops which are carried downstream toward the eliminating means 12, the function of the eliminating means, which will now be described in detail, being to collect these drops and to convey them out of the air stream. Referring particularly to Figs. 2, 7 and 8, the eliminating means 12 comprises a plurality of rows of vertical, substantially V-shaped collecting vanes 50 having their apices directed upstream, the vanes in alternate rows being located midway between the vanes in the rows thereadjacent so that the vanes in each row are staggered with respect to those in adjacent rows. The collecting vanes 50 extend from the top to the bottom of the housing section 26 and are mounted on lateral rods 51 which extend through the vanes and which are welded or otherwise secured to the housing section, the rods being enlarged between the arms of each vane, as indicated at 52, to prevent lateral movement of the vanes along the rods. The collecting vanes 50 shown in Fig. 8 are provided with inturned trailing edges 53, although we may employ collecting vanes without such inturned edges, such a collecting vane being indicated by the numeral 54 in Fig. 9.

Considering the operation of the eliminating means 12, the collecting vanes 50 are adapted to collect the drops of water entrained in the air leaving the coalescing means 11 in any one of several ways. In the first place, it will be apparent that low pressure areas will be created within the vanes 50 and on the downstream sides thereof as the air is accelerated in flowing around the vanes. Thus, some of the air tends to flow into such low pressure areas and carries any drops of liquid entrained therein into the interiors of the vanes so that such drops may flow downwardly to the bottom of the housing section 26. Secondly, some of the drops entrained in the air leaving the coalescing means 11 will impinge on the upstream faces of the collecting vanes 50 and, subsequently, will either swirl around the trailing edges of the vanes into the interiors thereof, or flow downwardly along the upstream faces of the vanes to the bottom of the housing section 26. As the water collected by the vanes 50 flows downwardly into the bottom of the housing section 26, it may be removed therefrom through a drain line 55 which leads to some suitable point of discharge (not shown).

It will be understood that the collecting vanes 50 may be arranged in various manners depending upon the efficiency desired for the eliminating means. For example, the pressure drop through and the efficiency of the eliminating means 12 may be varied by varying the spacing of the vanes 50 in the rows, by varying the widths of the vanes at their downstream ends, by varying the spacing and/or number of rows, etc.

As indicated previously, the function of the by-pass means 13 is to divert the air stream around the coalescing means 11 in the event that flow through the latter is prevented by the formation of ice therein, for example. Ice may form in the coalescing means 11 if the air is cooled to a temperature substantially below 32° F. during expansion, which may occur occasionally under operating conditions encountered by air condition-systems installed in aircraft. For example, in order to maintain the air in the cabin of an airplane at a comfortable temperature while the airplane is awaiting clearance for take-off on an unusually hot day, it may be necessary to cool the air supplied to the cabin to a much greater extent than would normally be the case and, if such conditions obtain for an extended period of time, sufficient ice may form in the coalescing means 11 to prevent flow therethrough. The function of the by-pass means 13, which will now be considered in detail, is to divert the air around the coalescing means 11 when such conditions obtain so as to prevent damage to the air conditioning system and so as to provide an uninterrupted supply of cooled air to the cabin. It will be noted that although the humidity of the air supplied to the cabin under such circumstances may be higher than desirable, this is but a temporary condition.

Referring particularly to Fig. 2, the by-pass means 13 comprises a pair of flap valves 58 and 59 in the particular construction illustrated, these valves being disposed in the passages 33 and 34, respectively, adjacent the coalescing means 11 and being hingedly connected to two of the separators 31 forming part of the coalescing means. The valves 58 and 59 are normally held closed by a spring 60 attached to arms 61 and 62 on the respective valves, the spring being adapted to expand to permit the valves to open in the event that the air pressure upstream from the coalescing means 11 increases due to the presence of ice or other obstructions in the coalescing means. It will be understood that although the valves 58 and 59 are adapted to open in response to an increased pressure upstream from the coalescing means 11, the valves may be controlled by a thermostat or other suitable device if desired.

Although we have disclosed an exemplary embodiment of our invention herein and have considered this embodiment in connection with a specific application of the invention, it will be understood that we do not intend to be limited specifically thereto since the invention is susceptible to other applications and since various changes, modifications and substitutions may be incorporated in the exemplary embodiment disclosed, all without necessarily departing from the spirit of the invention. Accordingly, we hereby reserve the right to the protection afforded by the full scope of the appended claim.

We claim as our invention:

In apparatus for removing particles of liquid entrained in a stream of gaseous fluid: a conduit for the stream of gaseous fluid, said conduit including inlet and outlet ends in substantial alignment and an enlarged portion between said ends; coalescing means within said enlarged portion of the conduit, said coalescing means comprising a body of fibrous material between said inlet and outlet and in the main line of fluid flow through said conduit from said inlet to said outlet, there being a by-pass space in said enlarged portion of the conduit between the body of fibrous material and the adjacent wall of said conduit and outside said main line of fluid flow; and pressure responsive by-pass valve means in said by-pass space biased in the closing direction and openable by fluid pressure at the inlet side of the coalescing means when said pressure rises above a predetermined value.

SOREN K. ANDERSEN.
RAYMOND W. JENSEN.

References Cited in the file of this patent

UNITED STATES PATENTS

| Number | Name | Date |
|---|---|---|
| 494,264 | Seymour, Jr. | Mar. 28, 1893 |
| 1,708,065 | Jordahl et al. | Apr. 9, 1929 |
| 1,830,096 | Dollinger | Nov. 3, 1931 |
| 1,864,201 | Kegerreis et al. | June 21, 1932 |
| 1,953,156 | Dahlman | Apr. 3, 1934 |
| 2,130,107 | Somers | Sept. 13, 1938 |
| 2,410,371 | Vohes | Oct. 29, 1946 |
| 2,465,430 | Burke | Mar. 29, 1949 |

FOREIGN PATENTS

| Number | Country | Date |
|---|---|---|
| 9,630 of 1911 | Great Britain | Apr. 20, 1911 |
| 380,441 | Germany | Sept. 7, 1923 |
| 27,062 | Switzerland | Aug. 8, 1902 |